United States Patent

Bakó et al.

[11] Patent Number: 5,885,915
[45] Date of Patent: Mar. 23, 1999

[54] GLASS COMPOSITION

[75] Inventors: Zoltán László Bakó, Dunakeszi; Zoltán Kamill Suha, Budapest; Zsuzsanna Klára Varga, Dunakeszi, all of Hungary

[73] Assignee: General Electric Company, Schenectady, N.Y.

[21] Appl. No.: 899,443

[22] Filed: Jul. 24, 1997

[30] Foreign Application Priority Data

Jul. 30, 1996 [HU] Hungary ................. P9602087

[51] Int. Cl.$^6$ ................. C03C 3/89
[52] U.S. Cl. ................. 501/66; 501/67; 501/69; 501/70; 501/72; 313/480; 313/636
[58] Field of Search ................. 501/66, 67, 69, 501/70, 72; 313/400, 636

[56] References Cited

U.S. PATENT DOCUMENTS 5,391,523  2/1995  Marlor ................. 501/14

FOREIGN PATENT DOCUMENTS

| 603933 | 6/1964 | European Pat. Off. . |
| 0 603 933 | 6/1994 | European Pat. Off. . |
| 195 47 567A1 | 7/1996 | Germany . |
| 48-6012 | 1/1974 | Japan . |

OTHER PUBLICATIONS

Database WPI, Section Ch, Week 7432, Derwent Publications Ltd., London, GB; Class L02, AN 74–57500V, XP002046648 & JP 49 006 012 A (Tokyo Shibaura Electric Co), 19 Jan. 1974 *abstract*.

Chemical Abstracts, vol. 123, No. 16, 16 Oct. 1995, Columbus, Ohio, US; abstract No. 206791, Halfar, Jaroslav: "Lead– free crystal glass", XP002046647, *abstract* & CZ 278 012 A (Ornela, A. S., Czech Rep.).

*Primary Examiner*—Melissa Bonner
*Attorney, Agent, or Firm*—Pearne, Gordon, McCoy & Granger LLP

[57] ABSTRACT

The subject-matter of the invention is a glass composition, which is suitable for use in electric lamps, comprising $SiO_2$, $Al_2O_3$, $Na_2O$, $K_2O$, $Li_2O$, SrO, $B_2O_3$, and optionally CaO, MgO, $TiO_2$, $P_2O_5$, $Sb_2O_3$, $Fe_2O_3$, $MnO_2$, ZnO and/or $CeO_2$. It is characterized in that its $SiO_2$ content is 65–73 mass %, $Al_2O_3$ content is 0.5 to 2.5 mass %, $Na_2O$ content is 5 to 9 mass %, $K_2O$ content is 8 to 12 mass %, $Li_2O$ content is 0.4 to 1.5 mass %, SrO content is 0.5 to 5 mass %, $B_2O_3$ content is 2.1 to 5 mass %. Furthermore in addition to the components listed, it optionally also comprises maximum 2.5 mass % CaO, maximum 3.8 mass % MgO, maximum 1 mass % $TiO_2$, maximum 0.8 mass % $P_2O_5$, maximum 0.5 mass % $Sb_2O_3$, maximum 0.25 mass % $Fe_2O_3$, maximum 0.25 mass % $MnO_2$, maximum 5 mass % ZnO, and/or maximum 0.8 mass % $CeO_2$ with the condition that the total amount of SrO, ZnO and MgO in the composition is at least 1.7 mass %. Stems and bulbs made from the above glass composition and used in electric lamps are also subject matter of the invention.

11 Claims, 2 Drawing Sheets

GLASS COMPOSITION

BACKGROUND OF THE INVENTION

The invention relates to a glass composition which is suitable for use primarily in electric lamps.

Certain glass parts of electric lamps, for example stems of incandescent and fluorescent lamps, furthermore bulbs of some fluorescent lamps have been manufactured from relatively high (20–29 mass %) lead oxide-containing (PbO) glasses for a long time. The high lead oxide content ensures the expected high electric resistance as well as the satisfactory softness and good workability of the glass material.

However, it is known that a high lead oxide-containing glass can adversely affect the environment both during glass/lamp production process and in the form of waste arising at the users. For reason of environment protection, decreasing or even eliminating the lead content from the mass products made from glasses containing lead oxide has to be sought after. A European patent application No. EP 603 933 describes a lead-free glass composition suitable for use in electric lamps. Although the technical characteristics of the glass compositions described in this patent application (e.g.: electric resistance, thermal expansion, etc.) are closely approaching those of the lead glass compositions, it is a serious disadvantage that they comprise barium oxide in 7 to 11 mass % in addition to the components ($SiO_2$, $Al_2O_3$, $Na_2O$, $K_2O$, $Li_2O$, CaO, MgO) usually applied in the glass compositions. The BaO is less harmful than the PbO taking into account the present regulations of environmental protection, nevertheless it still has a strong poisoning effect and its use has to be avoided owing to reasons of labor hygiene.

SUMMARY OF THE INVENTION

We have set ourselves the objective to develop a glass composition which is suitable for use primarily in electric lamps and does not comprise either poisoning PbO and BaO or optionally ZnO while its characteristics determining applicability for electric lamps are at least equivalent to the known compositions containing BaO.

Our investigations have led to the recognition that by properly choosing the components of glass composition and the quantity rate of components compared to each other, it is possible to eliminate the BaO without impairment of the technical characteristics. Certain technical characteristics become even more favorable than those of the known compositions containing PbO or BaO.

Accordingly, the subject-matter of the invention is a glass composition, which is suitable for use in electric lamps, comprising $SiO_2$, $Al_2O_3$, $Na_2O$, $K_2O$, $Li_2O$, SrO, $B_2O_3$, and optionally CaO, MgO, $TiO_2$, $P_2O_5$, $Sb_2O_3$, $Fe_2O_3$, $MnO_2$, ZnO and/or $CeO_2$. The composition according to the invention is characterized in that its $SiO_2$ content is 65–73 mass %, $Al_2O_3$ content is 0.5 to 2.5 mass %, $Na_2O$ content is 5 to 9 mass %, $K_2O$ content is 8 to 12 mass %, $Li_2O$ content is 0.4 to 1.5 mass %, SrO content is 0.5 to 5 mass %, $B_2O_3$ content is 2.1 to 5 mass %. Furthermore in addition to the components listed, it optionally also comprises maximum 2.5 mass % CaO, maximum 3.8 mass % MgO, maximum 1 mass % $TiO_2$, maximum 0.8 mass % $P_2O_5$, maximum 0.5 mass % $Sb_2O_3$, maximum 0.25 mass % $Fe_2O_3$, maximum 0.25 mass % $MnO_2$, maximum 5 mass % ZnO, and/or maximum 0.8 mass % $CeO_2$ with the condition that the total amount of SrO, ZnO and MgO in the composition is at least 1.7 mass %.

DETAILED DESCRIPTION OF THE PREFERRED EMBODIMENTS

Figure 1:
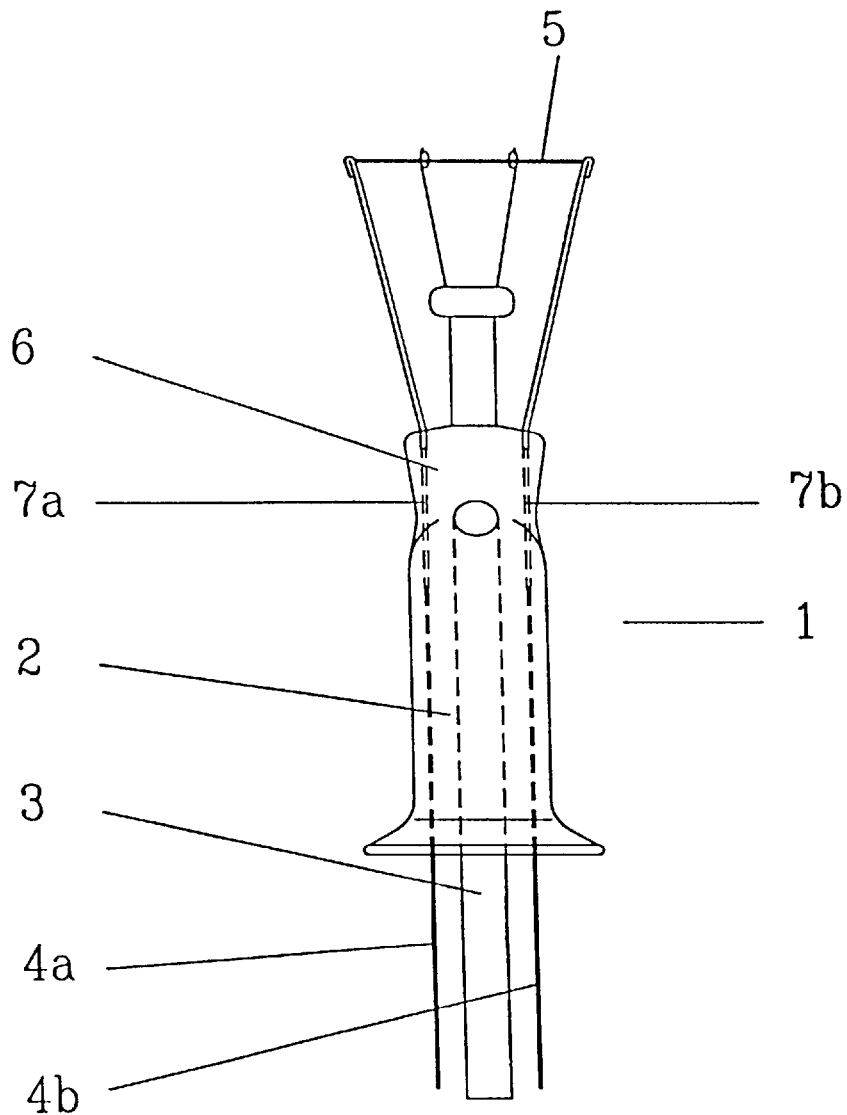
FIG. 1 shows a schematic view of a stem of an electric lamp.

In the glass composition according to the invention, the amount of $Al_2O_3$ is preferably 0.8 to 2 mass %, the amount of SrO is preferably 1.5 to 3.5 mass %, the amount of $B_2O_3$ is preferably 2.5 to 4.0 mass %, the amount of $TiO_2$ is preferably 0.1 to 0.5 mass % and the amount of $P_2O_5$ is preferably 0.2 to 0.6 mass %. It is also preferable if the glass composition contains MgO in 1 to 3 mass %.

Glass compositions in accordance with the invention preferably comprise alkaline earth metal oxides in a total amount of at least 2 mass %. In especially preferable cases, the total amount of alkaline earth metal oxides may be at least 4 mass %. Sometimes it is preferable, if the MgO content of the glass compositions reaches or exceeds the amount of SrO.

The existence of CaO is not necessarily required in the glass compositions in accordance with the invention, but it is preferable if the compositions used for stem-glasses contain it. The amount of CaO is 0.3 to 2 mass % in these compositions.

It is preferable if the glass composition contains ZnO, particularly if its MgO content is low. The use of ZnO, however, is not necessarily required.

It is advantageous if the boron trioxide components are added to the mixture used for glass melting in the form of borates (e.g. dehydrated borax [$Na_2B_4O_7$]) or minerals containing a borate (e.g. magnesium hydroborate). With the quantities used, $B_2O_3$ added in the form of a borate or a mineral will have no significant corrosive effect on the wall of the furnace.

$TiO_2$ and $P_2O_5$ occasionally found in the glass composition primarily cause a structure stabilizing effect.

It is primarily preferable to apply also $CeO_2$ in the composition in accordance with the invention if we want to produce also fluorescent bulb glass from the glass composition. This substance is primarily suitable for reducing the UV transmission of bulb glasses and it can also act as a refining agent at glass melting. The optional presence of $Sb_2O_3$ and $Fe_2O_3$ in the composition is suitable for similar purposes; furthermore the refining can also be promoted by $MnO_2$. $SO_3$ being optionally present in the composition is primarily a refining material. Some of the listed optional components (for example $Fe_2O_3$) can already be present as contamination in the starting raw materials of glass melting, thus to add them is unnecessary.

The glass compositions in accordance with the invention properly substitute the presently used lead-glasses taking into account their technical parameters determining their applicability for electric lamps, e.g., the electric resistance and the thermal expansion. It is an advantage that they do not contain BaO at all contrary to the solutions outlined in the technical literature (e.g. in the above mentioned European patent application No. EP603 933). Taking into account the viscosity values characterizing the workability, the glass compositions in accordance with this invention are more advantageous than those disclosed in the European patent application of No. 603 933 because they can be formed at lower temperature. It should be especially emphasized that their liquidus point value characterizing the susceptibility to crystallization ($T_{liq}$) is considerably lower than that of either the lead glasses or the glasses mentioned in the European patent application No. 603 933. This property indicates the favorable low devitrification property of the glass compositions in accordance with the invention. The intensity of crystallization below the liquidus temperature is considerably lower than that of the lead glasses. Some glass compositions investigated after a heat-treatment of 24 hours show no crystallization at all. The chemical resisitivity (water durability) of the glass compositions in accordance with the invention is excellent which is an extraordinarily good result taking into account their high alcaline metal oxide content. It is also a novelty that the viscosity of glass compositions in accordance with the invention meets the workability requirments of lamp and glass manufacturing although the technical literature, so the European patent application No. 603 933, considers the presence of BaO and its quantity limit as a critical factor from the point of view of glass-workability.

It is a special advantage of the glass composition in accordance with the invention that it is equally suitable for manufacturing stem glass, fluorescent lamp bulb glass and other speciality products (e.g. bulb glass of miniature incandescent lamps). It means that different products can be manufactured from the glass originating from the same melting furnace, consequently a more optimal manufacturing capacity may be achieved. It is a further advantage that a ZnO-free glass composition can be created without impairing the favorable technical characteristics mentioned above. Consequently, it is an advantageous solution taking into account environmental, health, and safety requirements. The following example is given for the composition details and application parameters of the glass compositions according to the invention.

EXAMPLE

The glass composition given in Table I was melted by batches of 350 kg at 1430°–1500 °C. in an intermittently operated tank furnace heated by natural gas. The components listed in Table I were added to the mixture in the following forms: $SiO_2$ as quartz sand, $Al_2O_3$ as alumina and/or feldspar, $B_2O_3$ as dehydrated borax, alkaline oxides and strontium oxide as relevant carbonates, CaO and MgO as dolomite or oxides, $P_2O_5$ as Ca or Na phosphate, and other listed components as relevant oxides. In some cases, the $Fe_2O_3$ can be found in the quartz sand as contaminant. Sodium nitrate was used as a refining agent. The components were previously premixed in a laboratory mixer except the quartz sand, soda, potash (Na-, or K carbonate) and the dehydrated borax, then this mixture was added to the other components in a mixing drum. Melting of the glass was carried out after a homogenizing process of 30 minutes by means of a technology usually applied in the glass industry.

The content of the glass composition is summarized in Table I, while its application characteristics are shown in Table II. As a comparison, the relevant data of glass compositions of a known lead-glass with PbO content of 20% (marked with "P") as well as the composition according to the European patent application No. EP 603 933 (marked with "B") are given in Table II. The definitions of the further symbols used in the Table II are as follows:

$\alpha_{(50-350)}$: thermal expansion coefficient between 50 ° and 350° C. (as per ISO Std. 7991), $T_g$: (dilatometric) transformation temperature (as per ISO Std. 7884-8), $T_L$: Littleton softening point (as per ISO Std. 7884-6), $T_{K100}$: the temperature where the value of $\log\rho$ (ohm cm) is 8 ($\log\rho$ is the common logarithm of the direct-current specific resistance value), $T_{liq}$: liquidus temperature above which the glass shows no crystallization (after a heat treatment lasting 24 hours), Water durability: chemical resistance to distilled water (extraction) as measured on crushed glass and characterized by the quantity of 0.01 N acid consumed for back titration (according to DIN Standard 12111), $T_{work}$: working temperature where the value of viscosity $\eta = 10^4$ dPa.

TABLE I

| Component | Quantity in mass % |
|---|---|
| $SiO_2$ | 70.61 |
| $Al_2O_3$ | 1.25 |
| $Na_2O$ | 7.16 |
| $K_2O$ | 10.4 |
| $Li_2O$ | 0.8 |
| CaO | 0.8 |
| MgO | 2.35 |
| SrO | 2.14 |
| $B_2O_3$ | 3.5 |
| $TiO_2$ | 0.2 |
| $P_2O_5$ | 0.3 |
| $Sb_2O_3$ | 0.3 |
| $Fe_2O_3$ | 0.06 |
| $MnO_2$ | 0.13 |

TABLE II

| Physical characteristics | | According to the invention | "P" | "B" |
|---|---|---|---|---|
| $\alpha_{(50-350)} \times 10^{-7}$ | 1/°C. | 99 | 98,9 | |
| $\alpha_{(25-300)} \times 10^{-7}$ | 1/°C. | | | 92.5 |
| $T_g$ | °C. | 500 | 441 | |
| $T_L$ | °C. | 679 | 630 | 675 |
| $T_{work}$ | °C. | 990 | 1000 | 1020 |
| $T_{k100}$ | °C. | 285 | 280 | 290 |
| Water durability, | ml/g | 1.05 | 2.5 | |
| Density | g/cm3 | 2.485 | 2.8 | 2.62 |
| $T_{liq}$ | °C. | 740 | 850 | 840 |

Of course, the glass in accordance with the invention can be used in all fields where the advantages provided by its favorable features are needed, thus especially in manufacturing lamp parts. It can be primarily used as stem and exhaust tube of incandescent lamps and as bulb and exhaust tube of low pressure discharge lamps (preferably compact fluorescent lamps), as well as bulb of miniature incandescent lamps.

The lamp parts whose material is made from the glass composition in accordance with the invention are also the subject matter of invention.

As exemplary embodiments, two solutions are given, namely:

FIG. 1 shows the stem of an electric lamp, and

Figure 2:
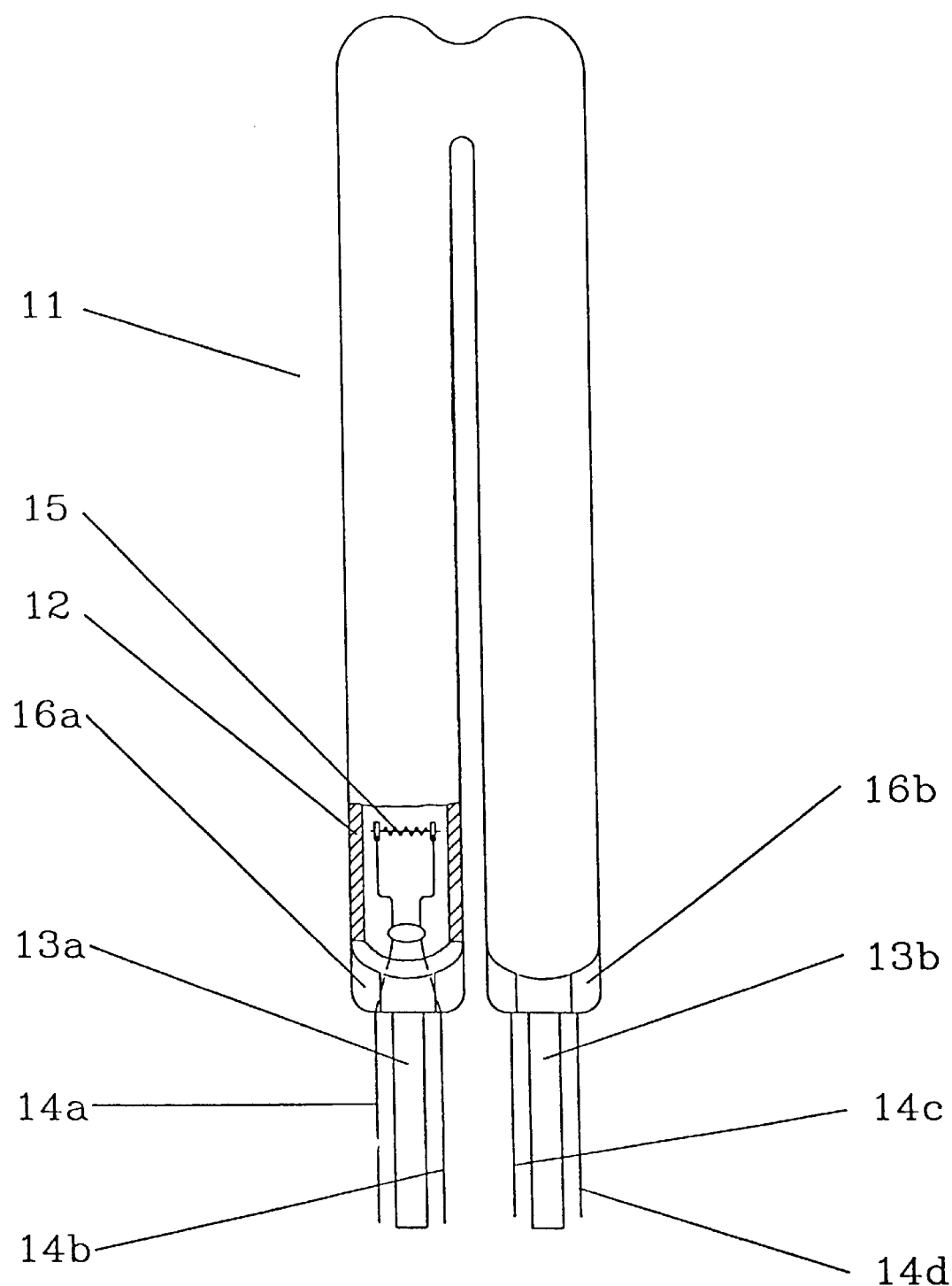
FIG. 2 shows a schematic view of a compact fluorescent lamp.

FIG. 2 shows a compact fluorescent lamp.

In FIG. 1, stem 1 of an incandescent lamp is seen which stem 1 consists of a flare 2, lead-in-wires 4a and 4b, a filament 5 and an exhaust tube 3. The filament 5 is clamped between the ends of the multipart lead-in-wires 4a and 4b. On the production line, the parts listed are heated by a flame and the parts are sealed together by pinching the flare 2 so that the dumet (copper-clad nickel-iron alloy) portions 7a and 7b of the lead-in-wires 4a and 4b get into the pinched portion 6 of the flare 2. The material of the flare 2 and the exhaust tube 3 is the glass composition according to the invention. The material of the lamp bulb (not shown) is a soda-lime-silicate soft glass comprising the following basic components: $SiO_2$, $Na_2O$, $K_2O$, CaO, MgO, $Al_2O_3$. The flare 2 is sealed in the lamp bulb at its skirted portion on the production line.

The stem according to the invention may also be the stem of another type of electric lamps, e.g., a low-pressure discharge lamp particularly a linear fluorescent lamp, etc.

In FIG. 2, a compact fluorescent lamp 11 comprising two tube portions is seen. Lead-in-wires 14a, 14b of its electrode 15 as well as lead-in-wires 14c, 14d of the other electrode (not shown) and exhaust tubes 13a and 13b are sealed in the ends of bulb 12 at pinched portions 16a and 16b. The material of the lead-in-wires 14a, 14b, 14c, 14d is a nickel clad 50—50% nickel-iron alloy. The material of the bulb 12 and the exhaust tubes 13a, 13b is the glass composition according to the invention. In order to filtrate UV radiation the material of the bulb 12 contains $CeO_2$ in an amount preferably of 0.4 to 0.6 mass %.

What is claimed is:

1. A glass composition for an electric lamp, said glass composition comprising:

$SiO_2$ 65 to 73 weight percent $Al_2O_3$ 0.5 to 2.5 weight percent $Na_2O$ 5 to 9 weight percent $K_2O$ 8 to 12 weight percent $Li_2O$ 0.4 to 1.5 weight percent SrO 0.5 to 5 weight percent $B_2O_3$ 2.1 to 5 weight percent, and wherein the glass composition is substantially free of BaO.

2. The glass composition of claim 1, comprising 1.5 to 3.5 weight percent SrO.

3. The glass composition of claim 1, further comprising 0.2 to 0.6 weight percent $P_2O_5$.

4. The glass composition of claim 1, comprising 2.5 to 4 weight percent $B_2O_3$.

5. The glass composition of claim 1, further comprising 0.1 to 0.5 weight percent $TiO_2$.

6. The glass composition of claim 1, wherein the glass composition comprises at least 2 weight percent alkaline earth oxides.

7. The glass composition of claim 1, further comprising 1 to 3 weight percent MgO.

8. The glass composition of claim 1, further comprising MgO in at least the same weight percent as the SrO.

9. A stem for an electric lamp, said stem being comprised of the glass composition according to claim 1.

10. A bulb for a fluorescent lamp, said bulb being comprised of the glass composition according to claim 1.

11. The glass composition of claim 1, further comprising CaO, MgO, $TiO_2$, $P_2O_5$, $Sb_2O_3$, $Fe_2O_3$, $MnO_2$, ZnO, and $CeO_2$, and wherein the glass composition has a maximum of 2.5 weight percent CaO, a maximum of 3.8 weight percent MgO, a maximum of 1 weight percent $TiO_2$, a maximum of 0.8 weight percent $P_2O_5$, a maximum of 0.5 weight percent $Sb_2O_3$, a maximum of 0.25 weight percent $Fe_2O_3$, a maximum of 0.25 weight percent $MnO_2$, a maximum of 5 weight percent ZnO, and a maximum of 0.8 weight percent $CeO_2$, and wherein the total amount of SrO, ZnO, and MgO in the glass composition is at least 1.7 weight percent.

* * * * *